(12) United States Patent
Cornelissen

(10) Patent No.: US 10,368,708 B2
(45) Date of Patent: Aug. 6, 2019

(54) HOUSEHOLD ROBOT AND METHOD FOR OPERATING A HOUSEHOLD ROBOT

(71) Applicant: Vorwerk & Co. Interholding GmbH, Wuppertal (DE)

(72) Inventor: Markus Cornelissen, Bornheim (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 15/570,189

(22) PCT Filed: Apr. 21, 2016

(86) PCT No.: PCT/EP2016/058890
§ 371 (c)(1),
(2) Date: Oct. 27, 2017

(87) PCT Pub. No.: WO2016/173919
PCT Pub. Date: Nov. 3, 2016

(65) Prior Publication Data
US 2018/0125318 A1    May 10, 2018

(30) Foreign Application Priority Data
Apr. 28, 2015  (DE) .......................... 10 2015 106 536

(51) Int. Cl.
*A47L 9/28* (2006.01)

(52) U.S. Cl.
CPC ........... *A47L 9/2826* (2013.01); *A47L 9/2852* (2013.01); *A47L 2201/06* (2013.01)

(58) Field of Classification Search
CPC ... A47L 9/2826; A47L 2201/06; A47L 9/2852
See application file for complete search history.

(56) References Cited

U.S. PATENT DOCUMENTS

| 6,389,329 B1 | 5/2002 | Colens |
| 2003/0005531 A1* | 1/2003 | van den Berg .......... A01K 1/01 15/3 |
| 2005/0132522 A1 | 6/2005 | Im et al. |

(Continued)

FOREIGN PATENT DOCUMENTS

| CN | 1284177 A | 2/2001 |
| EP | 2508957 A2 | 10/2012 |

(Continued)

*Primary Examiner* — Yonel Beaulieu
*Assistant Examiner* — Martin A Weeks
(74) *Attorney, Agent, or Firm* — The Webb Law Firm

(57) ABSTRACT

The invention relates to a household robot, in particular an automatically movable cleaning robot for a floor area, having a housing, having running gear which is arranged on the underside of the housing, having a sensor system for detecting the area surrounding the housing and having a control for automatically controlling the running gear, in which the technical problem of preventing soiling by excrement from a living being is solved by providing detection element for detecting a sub-area of the floor area which has been soiled by excrement from a living being and by the control element changing the operating mode of the household robot dependent on an output signal from the detection element. The invention also relates to a method for operating a household robot.

10 Claims, 1 Drawing Sheet

(56) References Cited

U.S. PATENT DOCUMENTS

| | | |
|---|---|---|
| 2008/0173247 A1 | 7/2008 | Mainini |
| 2012/0042563 A1* | 2/2012 | Anderson ............... G06N 5/04 43/132.1 |
| 2012/0103367 A1 | 5/2012 | Tang |
| 2012/0259481 A1 | 10/2012 | Kim |
| 2014/0207280 A1 | 7/2014 | Duffiey et al. |
| 2014/0336863 A1 | 11/2014 | So et al. |
| 2015/0052703 A1 | 2/2015 | Lee et al. |
| 2016/0278599 A1 | 9/2016 | Seo et al. |
| 2017/0231446 A1* | 8/2017 | Watanabe ............... A47L 9/00 15/319 |
| 2017/0231447 A1* | 8/2017 | Izawa ...................... A47L 9/28 15/319 |

FOREIGN PATENT DOCUMENTS

| | | |
|---|---|---|
| EP | 2801313 A2 | 11/2014 |
| EP | 3072432 A1 | 9/2016 |
| JP | 2000342497 A | 12/2000 |
| JP | 2005177459 A | 7/2005 |
| JP | 200729489 A | 2/2007 |
| JP | 2007209392 A | 8/2007 |
| JP | 2013146314 A | 8/2013 |
| JP | 2013248065 A | 12/2013 |
| JP | 20159109 A | 1/2015 |
| JP | 201527345 A | 2/2015 |
| JP | 201580560 A | 4/2015 |
| WO | 2014113806 A1 | 7/2014 |
| WO | 2014196272 A1 | 12/2014 |

\* cited by examiner

HOUSEHOLD ROBOT AND METHOD FOR OPERATING A HOUSEHOLD ROBOT

CROSS-REFERENCE OF RELATED APPLICATIONS

This application is the United States national phase of International Application No. PCT/EP2016/058890 filed Apr. 21, 2016, and claims priority to German Patent Application No. 10 2015 106 536.3 filed Apr. 28, 2015, the disclosures of which are hereby incorporated in their entirety by reference.

BACKGROUND OF THE INVENTION

Field of the Invention

The invention relates to a household robot, in particular an automatically movable cleaning robot for a floor area, having a housing, having a running gear which is arranged on the underside of the housing, having a sensor system for detecting the area surrounding the housing and having a control for automatically controlling the running gear. The invention also relates to a method for operating a household robot, in particular an automatically movable cleaning robot for a floor area.

Description of Related Art

In the context of this description, a household robot is understood as any automatically movable household appliance which carries out at least one household function. In particular, a household robot is understood as an autonomous ground treatment robot, for example a floor cleaning robot, in particular a vacuuming, mopping and/or sweeping robot. Such floor treatment robots have electrically operated suction-fan units and/or electric motor powered brushes and/or bristle rollers and/or mopping units. A lawn mower can also be understood as a ground treatment robot. In addition, a service robot which carries out a different function than a cleaning function, for example a transporting function, is understood as a household robot. The invention without limiting the disclosure is described below mainly in relation to cleaning robots for a floor area in the household which are mainly used as so-called robot vacuum cleaners in private homes and in business premises.

The energy supply of the automatically movable household robot takes place through rechargeable batteries. In order to charge the batteries and, in addition where necessary, to also dispose of the dirt or rubbish collected in a container inside the appliance, a base station connected to the household mains supply is assigned to the household robot.

The household robot locates the base station automatically, e.g. by means of radio guidance and/or light signal guidance or radio communication between base station and household robot. The request to go to the base station can be effected automatically, thus e.g. by radio communication between base station and household robot. The household robot can equally go to the base station by itself depending on the filling level of the dirt container inside the appliance and/or depending on the charge state of the rechargeable batteries. Furthermore, the household robot can automatically go to the base station after completing a task to be carried out, e.g. cleaning a specified floor area.

The automatic functioning of the household robot is considered a valuable characteristic, since the household robot is autonomous and hence can operate without a person being present. In particular, monitoring the floor area to be driven over, particularly the floor area to be cleaned, is left to the household robot alone.

As a consequence, with household robots up to now, the problem has occurred that the floor area is also driven over and where appropriate treated, in particular cleaned, when excrement from a living being, in particular from an animal, but also from a human being, for whatever reason is present. Both urine and faeces are understood as excrement. In such a case, the excrement is distributed either by the running gear over further sub-areas of the floor area or distributed by a cleaning mechanism, which as appropriate is present, on or in the household robot. As a result, in each case an unpleasant situation occurs which the user of the household robot would like to avoid.

Therefore, the invention is based on the technical problem of improving household robots and a method for operating a household robot in such a way that the disadvantages described can be at least partly prevented.

The JP 2007 29489 discloses an autonomously driven cleaning robot with a smell sensor, with means for analyzing the smell detected by the smell sensor and with means for determining the cleaning period. Through the small sensor it is ought to be detected if an animal is present in the area to be cleaned. If an animal is detected, the cleaning period of the cleaning robot is supposed to be reduced to ensure a clean ground despite of the pollution through hair, etc.

SUMMARY OF THE INVENTION

The previously identified technical problem is solved according to the invention by a household robot of the type mentioned at the outset providing detection means for detecting a sub-area of the floor area which has been soiled by excrement from a living being and by the control means changing the operating mode of the household robot in dependency of an output signal from the detection means. In this way, the household robot can autonomously react to the presence of excrement on the floor area and prevent additional distribution and further soiling.

According to the invention, the control means control the running gear in order to at least partly prevent the soiled sub-area from being driven over. Consequently, the household robot is to a large extent or possibly even completely prevented from driving over the excrement. The household robot only partly driving over the excrement occurs if the excrement can only be detected and localised too late or imprecisely and the running gear cannot be controlled in time or only imprecisely. However, even with only partial prevention, further spreading of the soiling by the excrement can be kept as low as possible. The control means are set up in such a way that the running gear is either turned off or is controlled in such a way that the household robot moves away from the soiled sub-area of the floor or bypasses it.

A further embodiment of the described household robot consists in providing a cleaning mechanism and in the control means at least partly preventing the soiled sub-area from being cleaned in dependency of an output signal from the detection means. In this way, in addition or alternatively to controlling the running gear, it can be ensured that the cleaning device is not or only partly soiled by the excrement.

There are various possibilities for designing the detection means, in order to achieve the described effect.

In one preferred embodiment of the household robot, the detection means have at least one infrared camera for recording a thermal image of the surroundings of the housing and evaluation means are provided for evaluating the thermal image. The control then at least partly prevents the soiled sub-area from being driven over and cleaned if at least one sub-area of the thermal image has a predefined difference in temperature to the further surroundings. At the same time, it is preferred if the temperature difference is equal to or greater than 5° C. compared to the further surroundings. Therefore, the evaluation means are an image evaluation unit which evaluates the thermal image taken for deviations in the recorded temperature distribution. The evaluation means can consequently detect in a spatially resolved manner excrement or sub-areas of the floor area which are comparably soiled and in any event not to be travelled over. As a result, the robot can be stopped in a targeted way or can bypass the sub-area when the spatial information is transmitted to the control of the running gear.

In an alternative embodiment of the household robot, the detection means have at least one gas sensor for detecting at least one specific gas concentration and evaluation means for evaluating the specific gas concentration are provided. Preferably, the at least one gas sensor is arranged in the front area of the household robot in the normal direction of travel or in the suction area of a floor cleaning robot. The control then at least partly prevents the soiled sub-area from being driven over and cleaned if the specific gas concentration exceeds a predefined limit value. In this case, it does not come down to a conspicuous temperature but rather to a certain smell, i.e. a specific gas concentration, in order to detect a sub-area of the floor area soiled with excrement. Therefore, excrement which has already taken on the surrounding temperature can be reliably detected. However, the spatial resolution is lower compared to a thermal imaging camera.

Preferably, the at least one sensor detects at least one specific concentration of methane, ammonia, butanoic acid, phenol, caproic acid, mercaptans or of hydrogen sulphides. The named gases are specifically for excrement from living beings and enable excrement to be reliably detected. It is advantageous if a plurality of sensors is used in parallel for different gas concentrations.

The above disclosed technical problem is also solved by a method for operating a household robot, in particular an automatically movable cleaning robot for a floor area, wherein the household robot has running gear, in which the floor area to be travelled over is detected for the presence of excrement from a living being, and in which the setting of a function of the household robot is changed when excrement is detected, and in which the setting of the running gear is changed in such a way, that at least partly the soiled sub-area is prevented from being driven over. Hence, a household robot can be operated in such a way that when excrement occurs on the floor area the household robot itself and/or the rest of the floor area is soiled as little as possible if at all. The application of the household robot is thereby more user-friendly.

According to the invention, the setting of the running gear is changed when excrement is detected on the floor area. In particular, in such a case the running gear can be stopped. It is equally possible when excrement is detected for the sub-area of the floor area which is soiled with the excrement to be bypassed. In this way, the household robot is actively prevented from travelling over the sub-area of the floor area soiled by the excrement and hence the running gear is prevented from further spreading the soiling.

A further embodiment of the described method consists in switching off a cleaning mechanism when excrement is detected. In this case, the household robot is a floor treatment robot having a cleaning mechanism which in particular is designed as an electrically operated suction-fan unit and/or electric motor powered brushes and/or a bristle roller and/or a mopping unit. By means of the described method, it is actively ensured that the cleaning mechanism does not come into contact with the excrement and that soiling of the cleaning mechanism and hence of the household robot itself is to a large extent, if not completely, prevented.

The previously described method can also be further developed by showing the detection of excrement on a display and/or by showing the position of the sub-area of the soiled floor area on a display. In this way, the user of the household robot can be better informed as to why, for example, the household robot has stopped and interrupted its work to be carried out autonomously.

BRIEF DESCRIPTION OF THE DRAWINGS

The invention is explained below by means of exemplary embodiments with reference to the figures.

Figure 1:
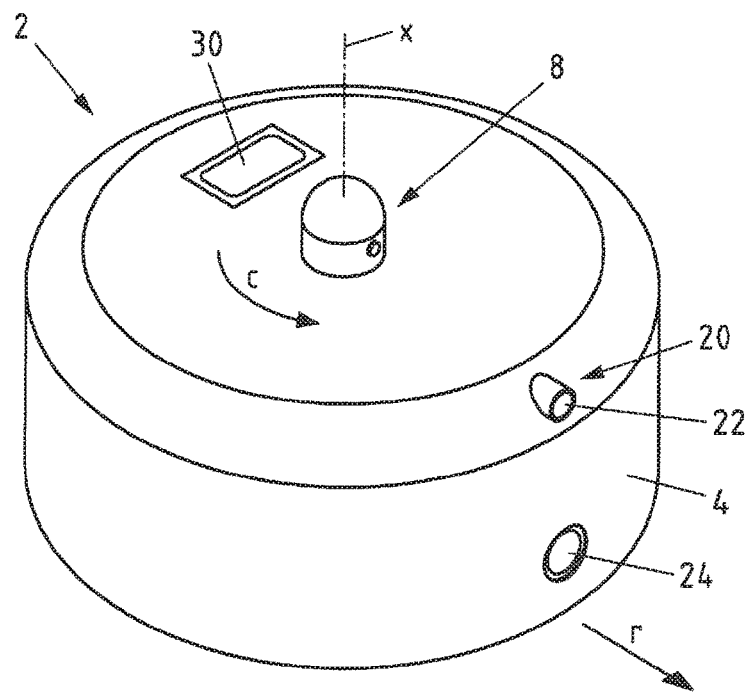
FIG. 1 shows an exemplary embodiment of a household robot according to the invention in a perspective view from above and FIG. 2 shows the household robot illustrated in FIG. 1 in a perspective view from below.
Figure 2:
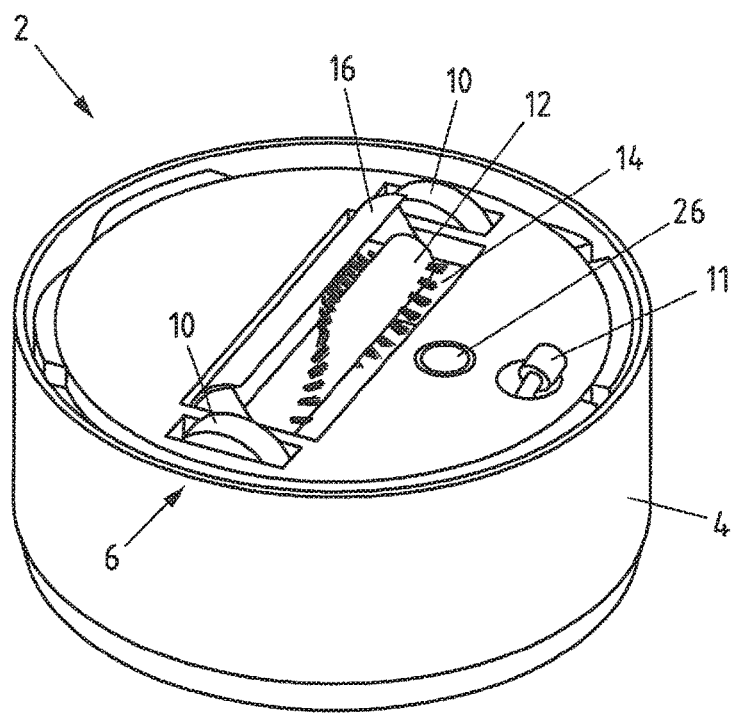

A household robot according to the invention in the form of a floor cleaning robot 2 is illustrated in FIGS. 1 and 2. The floor cleaning robot 2 has a housing 4, running gear 6 arranged on the underside of the housing 4, a sensor system 8 for detecting the area surrounding the housing 4 and a control for automatically actuating the running gear 6.

The running gear 6 is arranged on the underside of the housing 4 and faces the floor area to be cleaned. The running gear 6 has two electric motor powered drive wheels 10 and an idler wheel 11, so that a three-point support of the floor cleaning robot 2 is obtained on the floor area to be cleaned. By controlling the two drive wheels 10 differently, the floor cleaning robot 2 can be moved in any direction, wherein a forward movement in the direction of arrow r is carried out according to FIG. 1. A rotation on the spot and a backward movement in the opposite direction of the arrow r are equally possible.

As emerges from FIG. 2 in particular, on the underside of the housing 4 an electric motor powered brush 12 protruding beyond the bottom edge is arranged inside a suction opening 14. In addition, a suction fan motor (not illustrated) is provided which is also electrically powered. A dustpan-like ramp 16 is also provided, via which the brushed-up dirt particles are conveyed into a container-like receptacle (not illustrated).

The electric power is supplied to the individual components of the floor cleaning robot 2, i.e. to the electric motor of the of the drive wheels 10, to the electric drive of the brush 12, to the suction fan and to the further electronics of the control by means of a rechargeable battery (not illustrated).

In order to be able to identify the surroundings, room boundaries and possible obstacles and in order in particular to prevent the floor cleaning robot 2 from getting stuck, the sensor system 8, which has already been mentioned, is provided which is designed as a sensory obstacle detection system. This consists of an optical transmitting unit and an optical receiver unit which are both integrated in the sensor system 8 illustrated in FIG. 1. In this exemplary embodiment, the sensor system 8 is arranged rotatable around a vertical axis x of the housing 4, as is illustrated with the arrow c in FIG. 1.

According to the invention, detection means 20 are provided for detecting a sub-area of the floor area soiled by excrement from a living being, on which the floor cleaning robot 2 is located, and the control means change the operating mode of the floor cleaning robot 2 dependent on an output signal from the detection means 20. To that end, the control means can control the running gear 6 in such a way that the floor cleaning robot 2 is at least partly prevented from travelling over the soiled sub-area. Alternatively or in addition, the control means can at least partly prevent the soiled sub-area from being cleaned dependent on an output signal from the detection means 20.

The detection means 20 can be designed differently, as described below.

In the case of the exemplary embodiment illustrated in FIG. 1, the detection means 20 have at least one infrared camera 22 for recording a thermal image of the area surrounding the housing 4. Evaluation means (not illustrated), which can also form part of the control, are provided to evaluate the thermal image and the control then at least partly prevents the soiled sub-area from being travelled over and cleaned if at least one sub-area of the thermal image has a predefined difference in temperature to the rest of the surrounding area. In particular, during evaluation a temperature difference which is greater than or equal to 5° C. is looked for in the thermal image taken.

The activity of the infrared camera 22 can also be shut down, in order to prevent misinterpretations occurring when evaluating the camera signal in rooms which have underfloor heating. A further option consists in detecting regular contours or edges in the image signal of the infrared camera and assigning them to the room. The floor surface can, for example, be heated by rays of sunshine, electric cables or heating pipes, whereby regular contours and edges exist.

A further alternative for the design of the detection means is illustrated in FIGS. 1 and 2. In this case, the detection means 20 have a gas sensor 24 and/or 26 for detecting at least one specific gas concentration. The evaluation means already referred to are provided for evaluating the specific gas concentration and the control then at least partly prevents the soiled sub-area from being travelled over and cleaned if the specific gas concentration of at least one sensor 24, 26 exceeds a predefined limit value.

The gas sensor 24 is arranged on the housing 4 in the main direction of travel r. The alternative gas sensor 26, on the other hand, is arranged on the underside of the housing 4 in the area of the suction mouth 14. Thus, in the illustrated exemplary embodiment, two gas sensors 24 and 26 are provided. However, it is also possible for only one of the two gas sensors to be used or for even more gas sensors to be arranged at different places in or on the housing 4.

The gas sensors 24 and/or 26 are able to analyse the surrounding air with respect to a specific gas concentration. The sensor 24 and/or 26 can detect at least one specific concentration of methane, ammonia, butanoic acid, phenol, caproic acid, mercaptans or of hydrogen sulphides. These specific gases are characteristic for excrement of living beings, so that a corresponding output signal, which indicates the presence of excrement, is produced when a limit value of the specific concentration of the gas to be detected is exceeded.

As is additionally shown in FIG. 1, the housing 4 has a display 30 on its upper side, on which, inter alia, it can be displayed whether and as the case may be where excrement has been detected on the floor area.

The invention claimed is:

1. A household robot comprising:
   a housing,
   a running gear which is arranged on the underside of the housing,
   a sensor system for detecting the area surrounding the housing, and
   a control means for automatically controlling the running gear,
   wherein detection means for detecting a sub-area of the floor area which has been soiled by excrement from a living being are provided, and wherein the detection means comprise at least one gas sensor for detecting at least one specific gas concentration,
   wherein evaluation means for evaluating the specific gas concentration are provided,
   wherein the control means change the operating mode of the household robot in dependency of an output signal from the detection means, and
   wherein the control means control the running gear in order to at least partly prevent the soiled sub-area from being driven over or cleaned if the specific gas concentration exceeds a predefined limit.

2. The household robot according to claim 1,
   wherein a cleaning mechanism is provided, and
   the control means at least partly prevent the soiled sub-area from being cleaned in dependency of an output signal from the detection means.

3. The household robot according to claim 1,
   wherein the detection means have at least one infrared camera for recording a thermal image of the surroundings of the housing,
   evaluation means are provided for evaluating the thermal image, and
   the control means then at least partly prevents the soiled sub-area from being driven over and cleaned if at least one sub-area of the thermal image has a predefined difference in temperature to the further surroundings.

4. The household robot according to claim 1, wherein the at least one gas sensor detects at least one specific concentration of methane, ammonia, butanoic acid, phenol, caproic acid, mercaptans or of hydrogen sulphides.

5. A method for operating a household robot having a cleaning mechanism, a gas sensor, a control means, evaluation means for evaluating a specific gas concentration, and a running gear, the method comprising the steps of:
   detecting, with the gas sensor, for the presence of excrement from a living being on a floor area to be cleaned,
   evaluating, with the evaluating means, the specific gas concentration;
   determining, with the control means, whether the specific gas concentration exceeds a predefined limit;
   changing a setting of a function of the household robot, with the control means, when the specific gas concentration exceeds the predefined limit, and
   changing a setting of the running gear, with the control means, in such a way, that at least partly, a soiled sub-area is prevented from being driven over.

6. The method according to claim 5, wherein the running gear is stopped when excrement is detected.

7. The method according to claim 5, wherein when excrement is detected the sub-area of the floor area soiled with the excrement is bypassed.

8. The method according to claim 5, wherein a cleaning mechanism is switched off when excrement is detected.

9. The method according to claim 5, wherein the detection of excrement is shown on a display.

10. The method according to claim 5, wherein the position of the sub-area of the soiled floor area is shown on a display.

\* \* \* \* \*